US012753838B2

(12) United States Patent
Gabra et al.

(10) Patent No.: US 12,753,838 B2
(45) Date of Patent: Oct. 6, 2026

(54) TILTABLE FLOATING LIP SEAL

(71) Applicant: Flowserve Pte. Ltd., Singapore (SG)

(72) Inventors: Bassem Gabra, Thornton, PA (US); Joel Taylor, League City, TX (US); Glenn Robert Owens, Jr., Kalamazoo, MI (US); Matthew T. Fox, Marshall, MI (US); Todd T. Andres, Sparta, MI (US)

(73) Assignee: Flowserve Pte. Ltd., Singapore (SG)

(*) Notice: Subject to any disclaimer, the term of this patent is extended or adjusted under 35 U.S.C. 154(b) by 0 days.

(21) Appl. No.: 18/497,551

(22) Filed: Oct. 30, 2023

(65) Prior Publication Data

US 2024/0209946 A1 Jun. 27, 2024

Related U.S. Application Data

(60) Provisional application No. 63/434,868, filed on Dec. 22, 2022.

(51) Int. Cl.
*F16J 15/34* (2006.01)
*F16J 15/3232* (2016.01)

(52) U.S. Cl.
CPC ....... *F16J 15/3452* (2013.01); *F16J 15/3232* (2013.01)

(58) Field of Classification Search
CPC .. F16J 15/3212; F16J 15/3224; F16J 15/3232; F16J 15/3236; F16J 15/3452
See application file for complete search history.

(56) References Cited

U.S. PATENT DOCUMENTS 2,342,458 A * 2/1944 Davies ................. F16J 15/3212 562/56
3,713,659 A * 1/1973 Derman .................. B29C 69/00 277/400

(Continued)

FOREIGN PATENT DOCUMENTS

CN 216343911 U 4/2022
DE 839651 C 5/1952

(Continued)

OTHER PUBLICATIONS

Extended European Search Report for Application No. 23208739.5 mail date Apr. 23, 2024, 7 pages.

*Primary Examiner* — Christine M Mills
*Assistant Examiner* — L. Susmitha Koneru
(74) *Attorney, Agent, or Firm* — Maine Cernota & Curran

(57) ABSTRACT

A tiltable floating lip seal accommodates both radial displacements and axial misalignments between a shaft and a housing bore hole. Flexible axial arms at opposing ends of a seal ring assembly form seals with the housing to accommodate tipping and radial displacement of the shaft. The axial arms can be axial lips that slide against radial housing walls. The axial lips can extend from the seal ring assembly or from separate end rings that form lip seals to both the housing and the seal ring assembly. The axial lips can be energized by springs, such as canted coil springs or petalized U-shaped springs. In other embodiments, the distal ends of the flexible axial arms are fixed to the housing, for example compressed between elements of the housing. Buffer fluid can be introduced through ports to press the axial lips against the shaft or lift them slightly to reduce wear.

19 Claims, 14 Drawing Sheets

(56) References Cited

U.S. PATENT DOCUMENTS

| | | | | | |
|---|---|---|---|---|---|
| 4,311,315 | A * | 1/1982 | Kronenberg | F16J 15/3456 277/402 |
| 4,572,516 | A * | 2/1986 | Symons | F16J 15/164 277/377 |
| 5,172,917 | A * | 12/1992 | du Gay | F16J 15/3456 277/944 |
| 6,116,610 | A * | 9/2000 | Goldswain | F16J 15/38 277/584 |
| 6,325,379 | B1 * | 12/2001 | Rapp | F16J 15/002 277/351 |
| 8,336,887 | B2 * | 12/2012 | Petrak | F16J 15/3224 277/572 |
| 8,348,281 | B2 * | 1/2013 | Yoshida | F16J 15/322 277/560 |
| 9,383,018 | B2 * | 7/2016 | Ryther | F16J 15/3452 |
| 10,030,776 | B2 * | 7/2018 | Baumann | F16J 15/004 |
| 2001/0007385 | A1 * | 7/2001 | Lebeau | F16J 15/441 277/362 |
| 2014/0125014 | A1 * | 5/2014 | Panchal | F16F 1/187 277/550 |
| 2015/0061229 | A1 * | 3/2015 | Ryther | F16J 15/3224 277/375 |
| 2017/0167614 | A1 * | 6/2017 | Baumann | F16J 15/3296 |
| 2019/0162312 | A1 * | 5/2019 | Okaji | F16C 19/06 |
| 2020/0332897 | A1 * | 10/2020 | Mandou | F16J 15/3268 |

FOREIGN PATENT DOCUMENTS

| | | | |
|---|---|---|---|
| EP | 0439676 | A1 | 8/1991 |
| EP | 2385167 | A1 | 11/2011 |
| WO | 2016120556 | A1 | 8/2016 |

* cited by examiner

TILTABLE FLOATING LIP SEAL

RELATED APPLICATIONS

This application claims the benefit of U.S. Provisional Application No. 63/434,868, filed Dec. 22, 2022, which is herein incorporated by reference in its entirety for all purposes.

FIELD OF THE INVENTION

The invention relates to lip seals, and more particularly, to floating lip seals.

BACKGROUND OF THE INVENTION

There are many approaches for forming a seal between a stationary housing and a rotating shaft that extends from the environment, through a cylindrical "housing bore" provided in the housing, and into a sealed volume within the housing. For some applications, the rotating shaft may be supported by bearings on both sides of the seal, so that the shaft is held rigidly in coaxial alignment with the housing bore and is subject to almost no vibration or radial deflection. In other applications, the shaft may be subject to at least a small degree of vibration and radial deflection.

Lip seals can be an excellent approach for forming a seal with a rotating shaft, especially when there will be axial movement of the shaft, or when a certain degree of radial vibration of the shaft must be tolerated. In a lip seal, one or more seal rings surround the shaft and are sealed to a stationary housing. Each of the seal rings includes one or more flexible annular "lips" that extend radially inward and then axially forward or backward to form a seal with the shaft as it rotates. The flexible lips exert a spring-like tension radially inward toward the rotating shaft, such that, in some implementations, the lips form a direct contact seal with the shaft. In other implementations, a buffer fluid is introduced to either press the lips more firmly against the shaft, or to slightly lift the lips away from the shaft, thereby reducing frictional wear while allowing only a minute quantity of the buffer fluid to leak between the lips and shaft into the sealed volume and/or into the environment.

In some applications where relatively little radial motion or vibration of the shaft is expected, a "fixed" lip seal can be implemented. In a fixed lip seal, the seal ring or rings are mechanically fixed in position relative to the housing, and are maintained in coaxial alignment with the housing bore, such that any radial vibrations of the shaft are accommodated by a slight flexing of the seal lips.

With reference to FIG. 1, in other applications where larger radial vibrations or deflections of the shaft 102 are anticipated, a radially "floating" lip seal 100 can be implemented. In the illustrated example, a single seal ring 104 is sealed to radial walls 120 of the housing 106 by "rolling" O-ring seals 108 that permit the seal ring 104 and lips 110 to be deflected radially, thereby accommodating larger radial deflections of the shaft 102. A plurality of ring extensions 122 limit the degree to which radial displacements of the shaft 102 are able to deform the lips 110, so that larger radial shaft displacements must be accommodated by radial displacements of the seal ring as enabled by the rolling O-ring seals 108.

In the illustrated example, tension is maintained on the rolling O-ring seals 108 by an axially movable gland 112 that is pushed toward the seal ring 104 by a spring 114. Some of the lips 110 in the illustrated example are directed radially inward and axially to the left, while others of the lips 110 are directed radially inward and to the right. A port 116 is provided through which a buffer fluid, such as nitrogen gas, can be introduced between complementary pairs of lips 110 to reduce wear.

In FIG. 1, the lips 110 form a lip seal with a collar 118 that is fixed and sealed to the shaft 102. It will be understood that references herein to lips forming a seal with "the shaft" generically include seals to the shaft via intermediate structures such as the collar 118 of FIG. 1. It should also be noted that FIG. 1 is a simplified illustration in which some details, such as bolts that fix some of the elements to each other and small passages or pores through which the buffer fluid would flow, have been omitted for clarity of illustration.

While radially floating lip seals such as FIG. 1 can be effective for some applications, they can be problematic for other applications, including some implementations of cantilever rotating shafts, i.e. shafts that are supported on only one side of the seal. One example is a shaft that enters vertically into a sealed volume and terminates in a mixing element that is configured to agitate a mixture within the volume.

Because they are supported on only one side of a seal, cantilever shafts can be subject to significant radial displacements within the seal during operation, as well as significant tilting of the shaft axis, which results in misalignments between the longitudinal axis of the shaft and the longitudinal axis of the housing bore through which the shaft extends. These axial misalignments can lead to leakage of fluids past the lip seals, due to simultaneous over-compression of a portion of each lip seal accompanied by under-compression of an opposing portion of each lip seal. It can therefore be necessary in some cases to require that the seal itself resist and limit such movements of the shaft by bearing some of the shaft load. Essentially, the floating lip seal in such cases effectively functions as an additional bearing. This approach can lead to increased cost and/or wear of the lip seal.

What is needed, therefore, is a lip seal that can accommodate significant radial deflections of a rotating shaft, as well as misalignments between the shaft and the housing bore through which the shaft extends.

SUMMARY OF THE INVENTION

The present invention is a lip seal that can accommodate significant radial deflections of a rotating shaft, as well as misalignments between the shaft and the housing bore through which the shaft extends.

More specifically, the present invention is a "tilting" lip seal that includes a seal ring assembly comprising at least one seal ring. One or more radial lips extend inward from the seal ring assembly and form a seal with the shaft. In addition, a pair of flexible axial arms extend longitudinally away from opposing sides of the seal ring assembly and form a seal with the housing. Flexing of the axial arms thereby enables the seal ring assembly to be displaced radially, while compression and expansion of the axial arms enables the seal ring to tilt relative to the housing bore, so that the seal ring assembly can remain co-axial with the shaft, even when the shaft deviates from being co-axial with the housing bore.

In embodiments, the axial arms of the present invention function as axial lips that form lip seals with the housing. In some of these embodiments, the axial lips are sufficiently elastic by themselves to maintain a contact seal with radial housing walls even when the seal ring is tipped. In other embodiments, the axial lips are energized against the radial walls of the housing by annular "U" springs that are inserted into a space or "seat" between the axially directed lips and the seal ring assembly. In these embodiments, the axial lips extend axially from the seal ring assembly toward the radial walls, and then extend radially in parallel with the radial walls far enough to provide the U-shaped "seats" into which the U springs are inserted between the axial lips and the seal ring assembly. Each of the annular U-springs includes at least one side that is circumferentially "petalized," i.e. divided into a plurality of fingers or "petals" that extend radially outward, such that each "petal" can be flexed as much or as little as needed to main contact between that portion of the axial lip and the vertical housing wall.

In various embodiments, the radial lips are integral with the seal rings, and in some embodiments the axial lips are integral with the seal rings.

In other embodiments, distal ends of the axial arms are fixed to the housing, for example by being clamped between elements of the housing. In these embodiments, the distal ends of the axial arms remain fixed in location, while both radial displacements and axial tilting of the seal ring assembly are accommodated by flexing of the axial arms.

In some embodiments, the seal ring assembly includes only one seal ring, while in other embodiments the seal ring assembly includes a plurality of seal rings that are fixed to each other.

Embodiments include a series of more than one radial lip extending inward from the seal ring assembly. In some of these embodiments the lips are configured, as the pressure of a sealed process fluid increases, to allow a small amount of the process fluid to penetrate past at least one of the radial lips in the series, while leakage into the environment is prevented by a subsequent radial lip in the series. According to this approach, the radially inward force that must be exerted by each of the radial lips against the shaft is reduced, because the pressure of the process fluid is reduced as it penetrates past each of the radial lips, so that it is only necessary for the final radial lip in the series to exert sufficient inward force to contain the residual pressure of any process fluid that is able to penetrate past the other radial lips. As a result, the friction and wear of the radial lips is reduced.

Various embodiments further include a port and associated passages that enable a buffer fluid to be injected into the seal behind the radial lips, such that a small amount of the buffer fluid flows between the lips and the shaft into the sealed volume and/or environment, thereby lifting the radial lips slightly away from the shaft, thereby reducing wear. In some of these embodiments where a series of more than one radial lip extends inward from the seal ring assembly, the radial lips are configured to exert different amounts of radial force toward the shaft, thereby enabling the buffer fluid to penetrate past all of the radial lips, despite the reduction in the pressure of the buffer fluid that is induced by each successive radial lip in the series.

The present invention is a tiltable lip seal that includes a stationary housing penetrated by a bore having a longitudinal bore axis, a rotatable shaft penetrating said bore, said rotatable shaft having a longitudinal shaft axis, a seal ring assembly coaxially surrounding the rotating shaft, at least one radial lip extending radially inward from the seal ring assembly and configured to form a seal between the seal ring assembly and the shaft, and a pair of axial arms extending from opposing axial ends of the seal ring assembly and forming a seal between the seal ring assembly and the housing. Radial displacement of the seal ring assembly and of the radial lips and axial arms is enabled by at least one of flexing of the axial arms and sliding of the axial arms against the housing. Compression of portions of said axial arms and expansion of opposing portions of said axial arms enables the seal assembly to remain coaxial with and sealed to the shaft when the shaft axis is not aligned with the bore axis.

In some embodiments, the seal ring assembly is sandwiched between a proximate pair of annular radial walls of said housing, and the axial arms are axial lips that form lip seals with the radial walls of the housing. In some of these embodiments, the axial arms are axial extensions of the seal ring assembly, or the axial arms are included in end rings that form axial lip seals with both the seal ring assembly and with annular radial walls of the housing. In any of these embodiments, the axial lips can be maintained in sealing contact with the annular radial walls of the housing due to elasticity of the axial lips. Or, the embodiment can further comprise a pair of springs cooperative with the pair of axial lips and configured to press the axial lips into contact with the annular radial walls of the housing. In some of these embodiments, the springs are canted coil springs, or petal springs, which can be petalized on only one side thereof or on opposing sides thereof.

In other embodiments, distal ends of the axial arms are fixed to the housing and remain fixed in location, while both radial displacements and axial tilting of the seal ring assembly are accommodated by flexing of the axial arms. In some of these embodiments, the distal ends of the axial arms are fixed to the housing by being clamped between elements of the housing. In any of these embodiments, the axial arms can be axial extensions of the seal ring assembly.

In any of the above embodiments, the seal ring assembly can include a plurality of seal rings fixed and sealed to each other.

In any of the above embodiments, each of the radial lips can be formed in a separate lip module, each of the lip modules being separately sealed to the seal ring assembly.

In any of the above embodiments, the at least one radial lip can include a plurality of radial lips. In some of these embodiments, at least two of the radial lips extend axially in the same direction. In any of these embodiments, at least two of the radial lips can extend in opposite axial directions.

Any of the above embodiments can further comprise a buffer fluid port configured to enable introduction of a buffer fluid into the lip seal. In some of these embodiments, the lip seal is configured to cause a pressure of the buffer fluid to increase a radially inward force applied by at least one of the axial lips toward the shaft. And in any of these embodiments, the lip seal can be configured to cause small amounts of the buffer fluid to pass between the shaft and at least one of the radial lips, thereby lifting the radial lip away from direct contact with the shaft.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a lip seal that can accommodate significant radial deflections of a rotating shaft, as well as misalignments between the shaft and the housing bore through which the shaft extends.

Figure 1:
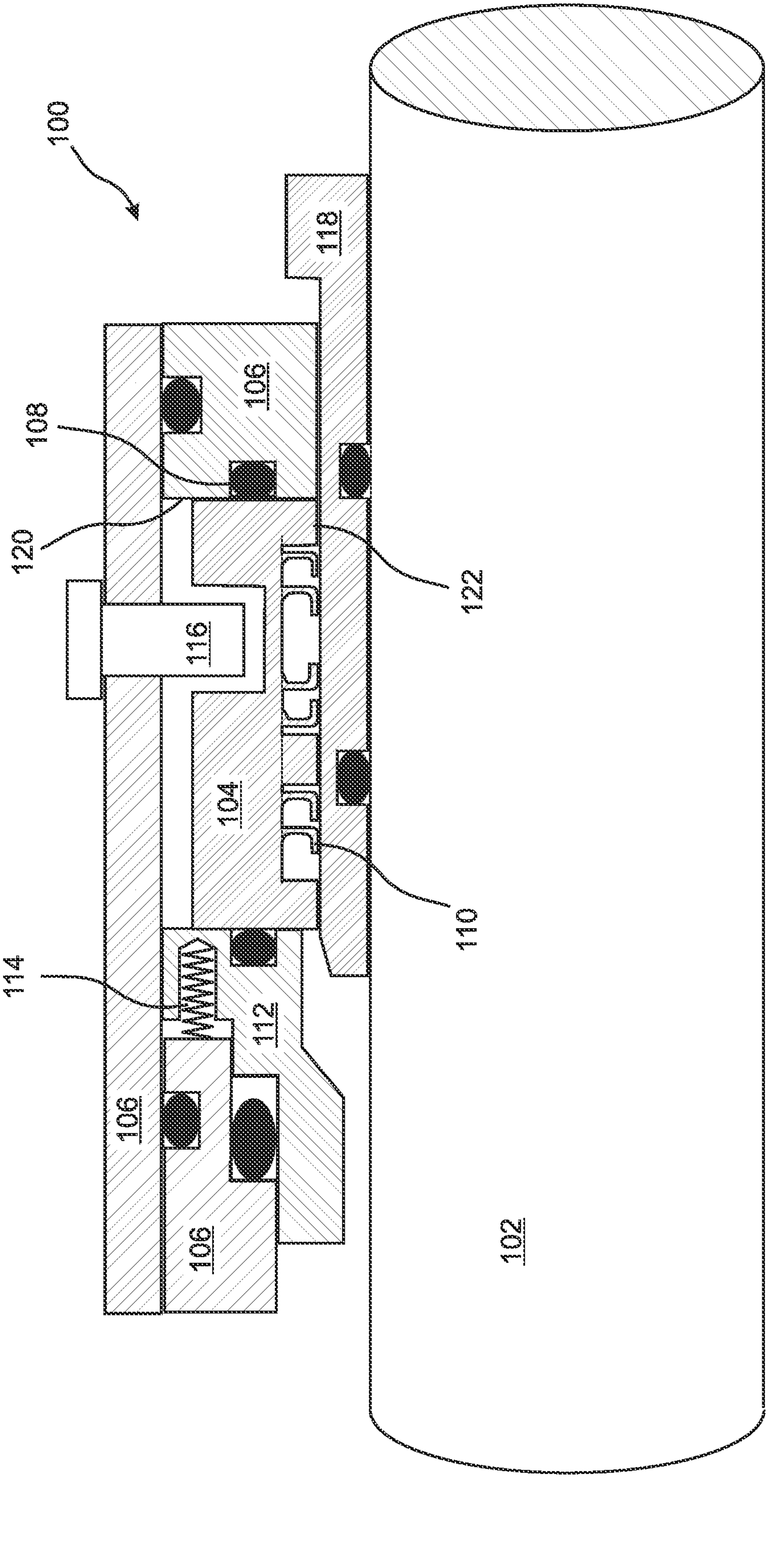
Fig. 1 (Prior Art)
FIG. 1 is a cross-sectional view of a floating lip seal of the prior art.
Figure 2:
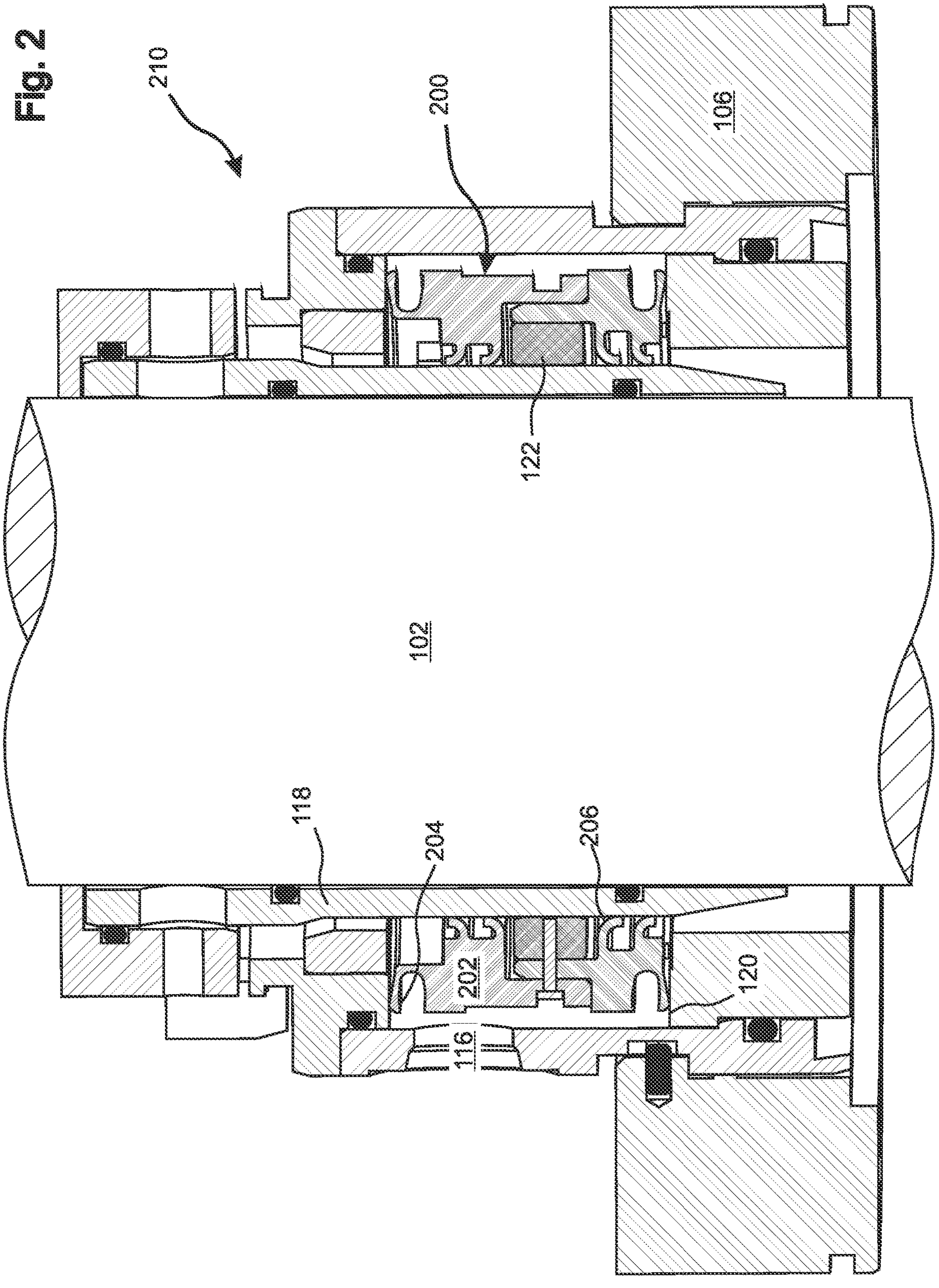
FIG. 2 is a sectional view, drawn to scale, of a tilting lip seal oriented vertically in an embodiment of the present invention where the axial arms of the seal assembly form radially slidable axial lips seals with radial walls of the housing.
Figure 3:
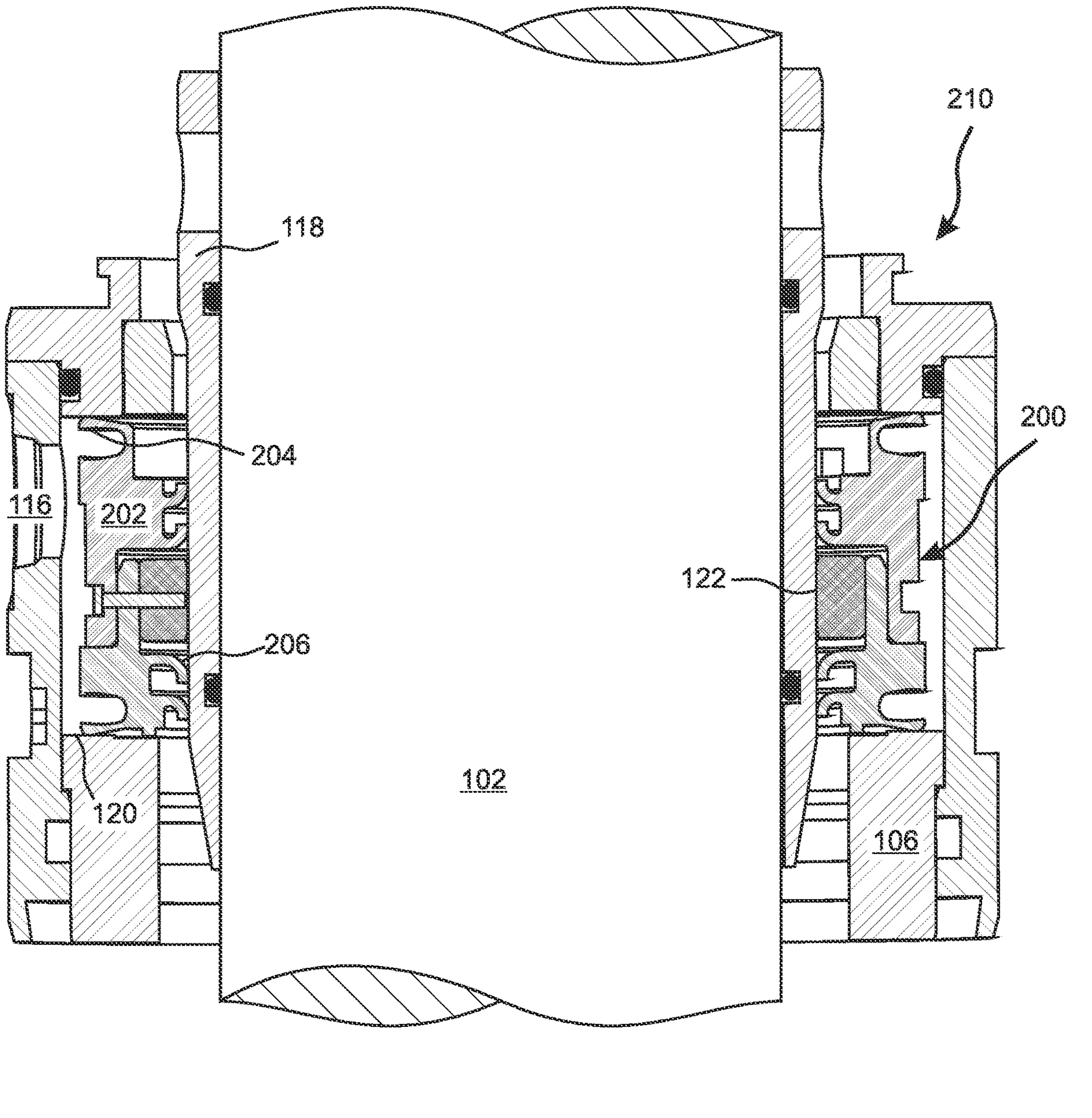
FIG. 3 is a closer sectional view, drawn to scale, of the embodiment of FIG. 2.
Figure 4:
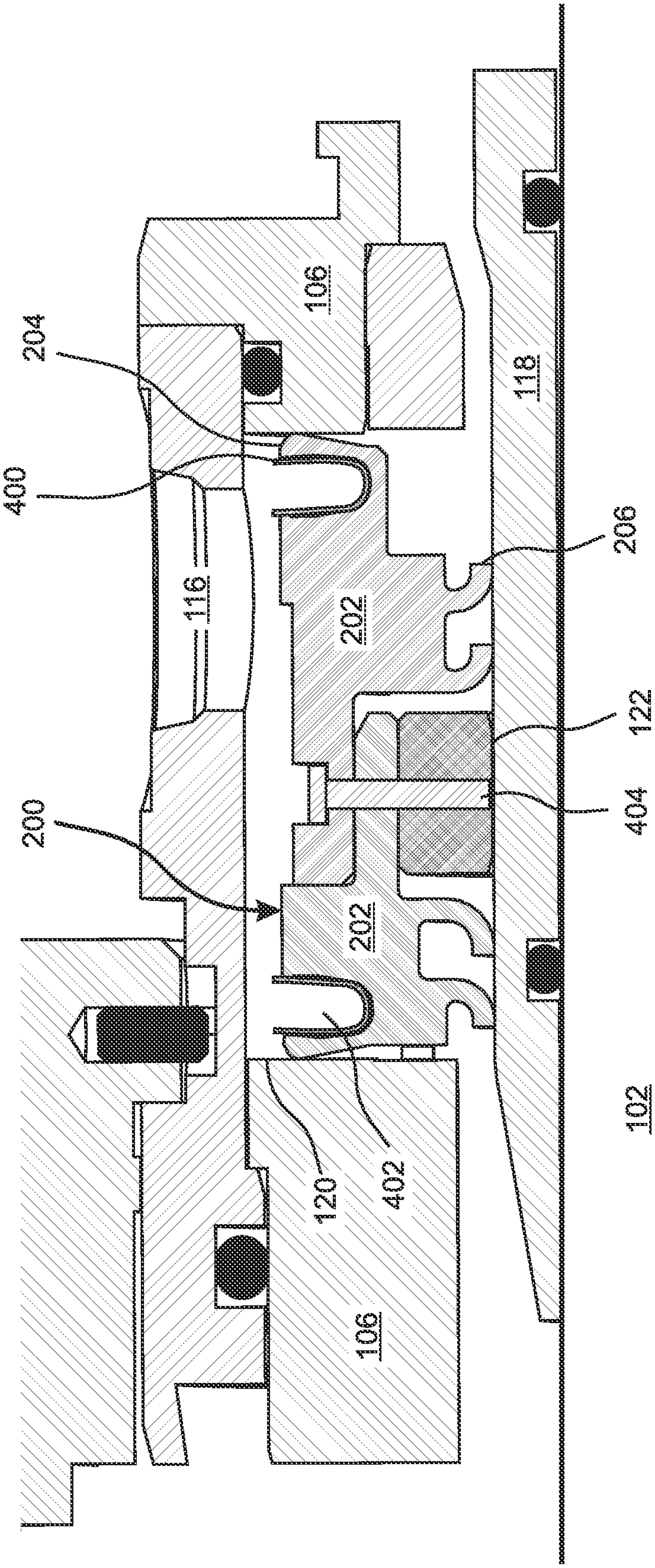
FIG. 4 is an even closer sectional view, drawn to scale, of an embodiment similar to FIG. 2 but including an annular petalized spring, the seal being oriented horizontally.

More specifically, with reference to FIGS. 2-4, the present invention is a "tilting" lip seal 210 that includes a seal ring assembly 200 comprising at least one seal ring 202. FIG. 2 is a sectional view of the complete seal 210 in an embodiment, oriented vertically. FIG. 3 is a closer sectional view of a portion of the same embodiment, and FIG. 4 is an even closer cross-sectional view of a smaller portion of the same embodiment, oriented horizontally.

According to the present invention, one or more radial lips 206 extend inward from the seal ring assembly 200 and form a seal with the shaft 102. In the illustrated embodiments, the seal with the shaft 102 is formed via a collar 118 that surrounds and is sealed to the shaft 102. In addition, a pair of flexible axial arms 204 extend longitudinally away from opposing sides of the seal ring assembly 200 and form a seal with the housing.

Figure 5:
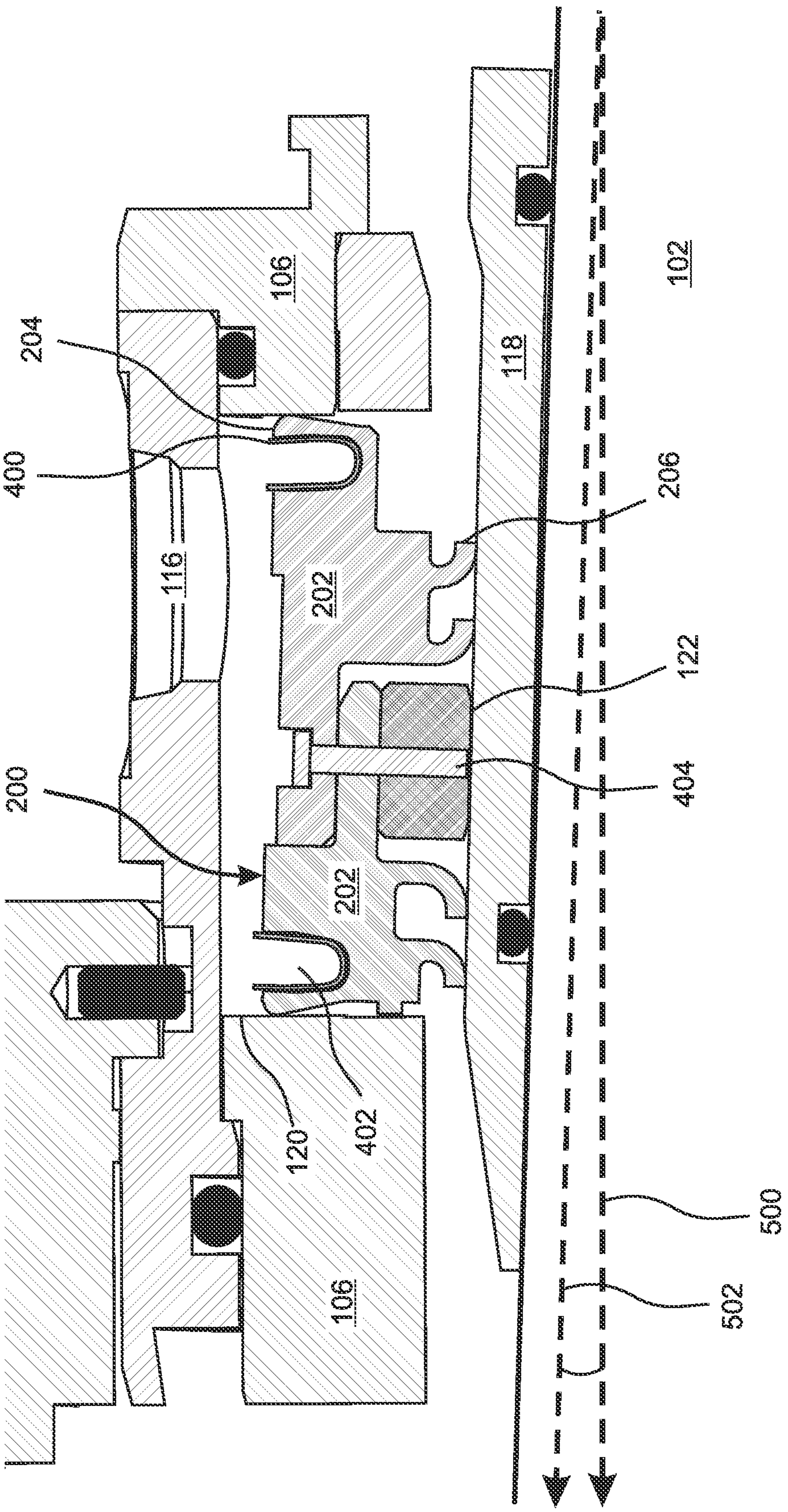
FIG. 5 is a sectional view similar to FIG. 4, drawn to scale, but shown with the rotating shaft tilted out of alignment with the housing bore.

In the embodiment of FIGS. 2-5, the axial arms 220 function as axial lips 220 that form lip seals with radial walls of the housing. With reference to FIG. 5, radial sliding of the axial lips 204 along the radial walls 220 of the housing thereby enables the seal ring assembly 200 with its associated lips 206, 204 to be displaced radially, while compression and expansion of the axial lips 204 enables the seal ring assembly 200 and lips 206, 204 to tilt relative to the housing bore, so that the longitudinal axis 500 of the seal ring assembly 200 can remain aligned with the longitudinal axis 502 of the shaft 102, even when the longitudinal axis 502 of the shaft 102 deviates from being co-axial with the longitudinal axis 500 of the housing bore.

In the embodiment of FIGS. 2-3, the axial lips 204 of the illustrated embodiment are sufficiently elastic by themselves to maintain a contact seal with the axial housing walls 120 even when the seal ring assembly 200 is tipped. In the embodiment of FIGS. 4-5, the axial lips 204 are energized against the radial walls 120 of the housing 106 by annular "U" springs 400 that are inserted into a space or "seat" 402 between the axially directed lips 204 and the seal ring assembly 200. In these embodiments, the axial lips 204 extend axially from the seal ring assembly 200 toward the radial walls 120, and then extend radially in parallel with the radial walls 120 far enough to provide the U-shaped "seats" 402 into which the U springs 400 are inserted between the axial lips 204 and the seal ring assembly 200.

Figure 6:
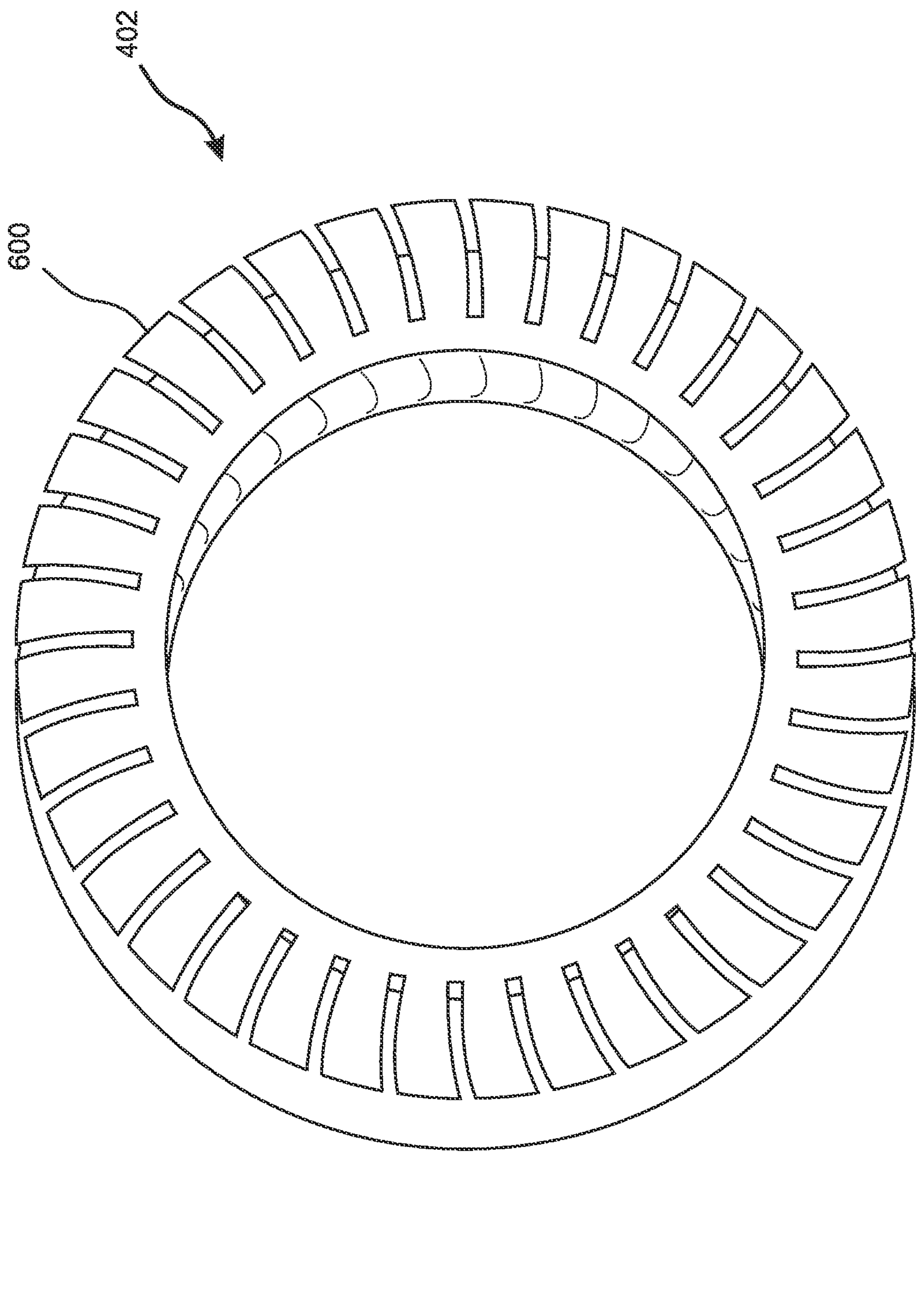
FIG. 6 is a perspective view of the petalized spring of FIGS. 4 and 5.

With reference to FIG. 6, each of the annular U-springs 400 includes at least one side that is circumferentially "petalized," i.e. divided into a plurality of fingers or "petals" 600 that extend radially outward, such that each "petal" 600 can be flexed as much or as little as needed to main contact between that portion of the axial lip 204 and the vertical housing wall 120.

Figure 7:
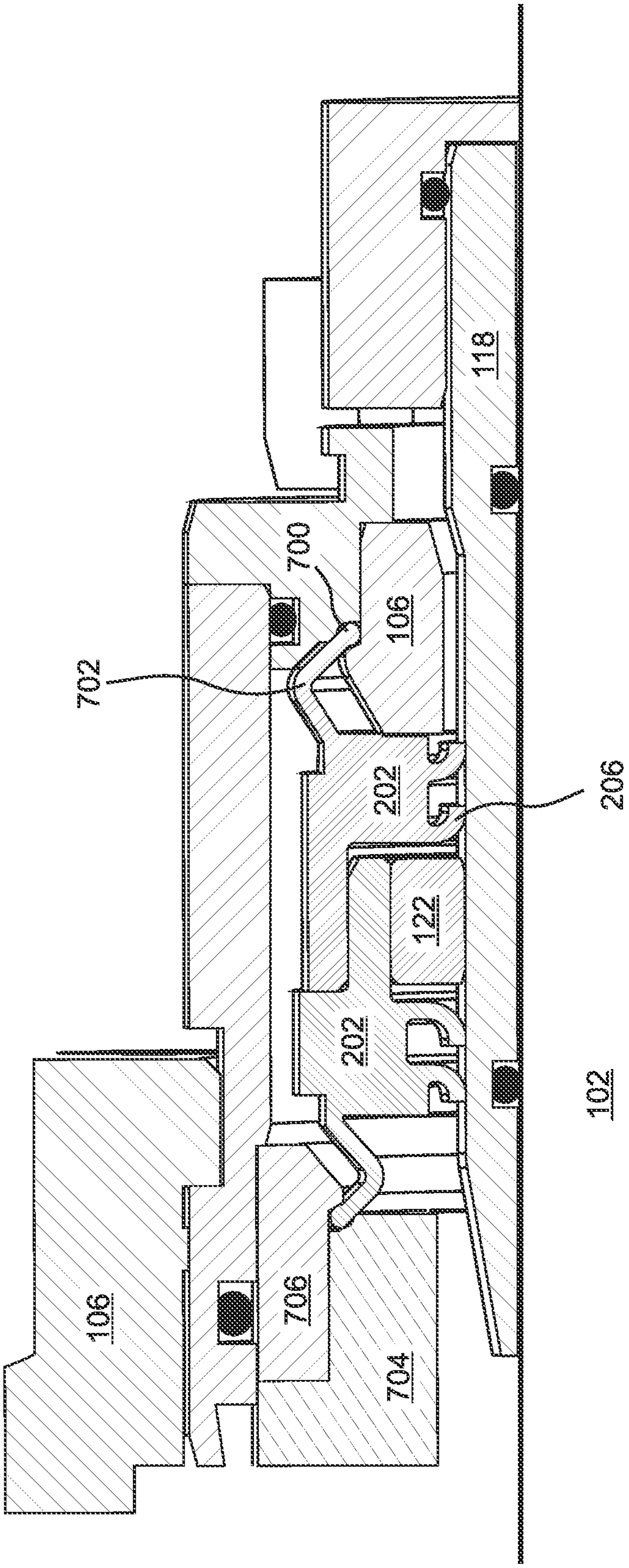
FIG. 7 is a sectional view, drawn to scale, of an embodiment of the present invention in which the distal ends of the axial arms are fixed and sealed to the housing.

With reference to FIG. 7, in other embodiments distal ends 700 of the axial arms 702 are fixed to the housing 106, for example by being clamped between elements 704, 706 of the housing 106. In these embodiments, the distal ends 700 of the axial arms 702 remain fixed in location, while both radial displacements and axial tilting of the seal ring assembly 200 are accommodated by flexing of the axial arms 702. In the embodiment of FIG. 7, the distal ends 700 of the axial arms 702 are rounded, and are compressed between the elements 704, 706 of the housing in a manner similar to an O-ring seal.

In some embodiments, the seal ring assembly 200 includes only one seal ring. In the embodiment of FIGS. 2-7, the seal ring assembly 200 includes a plurality of seal rings 202 that are fixed to each other. In the illustrated embodiments, the seal ring assembly 200 comprises two seal rings 202 and a ring "bearing" 122, all of which are fixed together by bolts 404. The ring bearing ensures that the seal ring 200 assembly is displaced radially along with the shaft 102, without undue flexing of the radial lips 206.

The embodiment of FIGS. 2-5 further includes a port 116 and associated passages (not shown) that enable a buffer fluid to be injected into the seal 210 behind the radial lips 206, such that a small amount of the buffer fluid flows between the radial lips 206 and the shaft 102 into the sealed volume and/or environment, thereby lifting the radial lips 206 slightly away from the shaft 102, thereby reducing wear. In some of these embodiments, the radial lips 206 are configured to exert different amounts of radial force toward the shaft 102, thereby enabling the buffer fluid to penetrate past all of the radial lips 206, despite the reduction in the pressure of the buffer fluid that is induced by each successive radial lip 206 in the series.

Figure 8A:
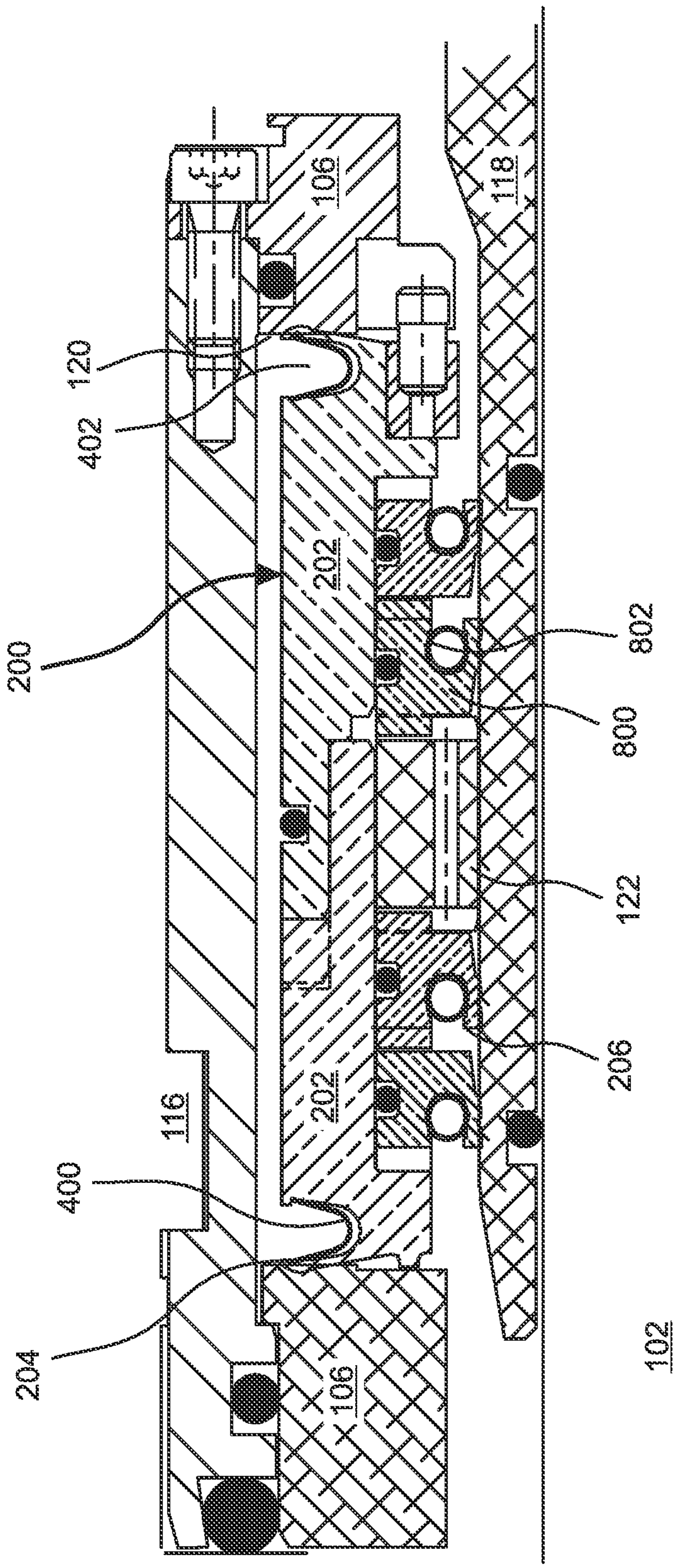
FIG. 8A is a sectional view, drawn to scale, of an embodiment similar to FIG. 4, but in which each of the radial lips is included in a separate lip module that is fixed and sealed to the seal ring.
Figure 8B:
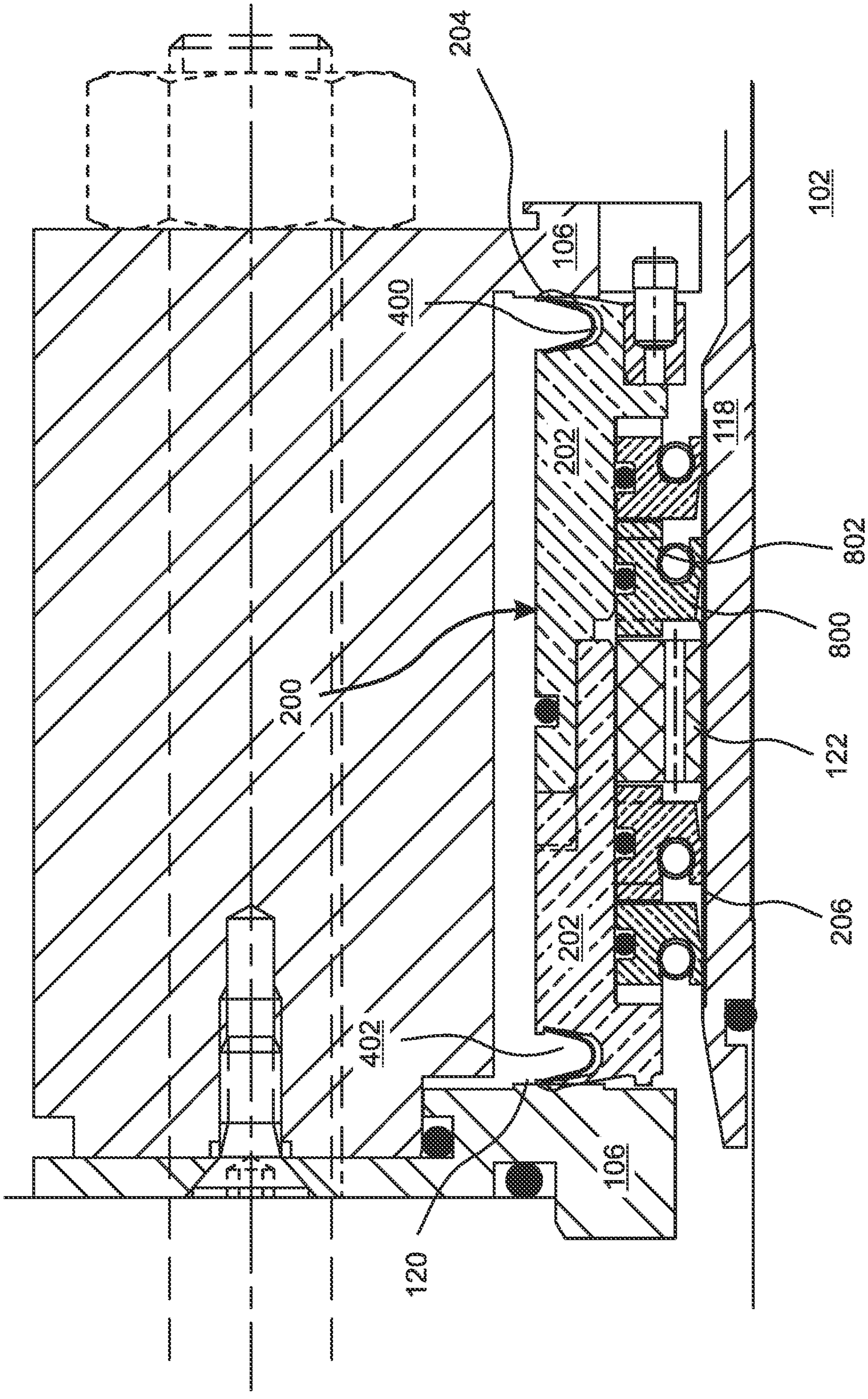
FIG. 8B is a sectional view, drawn to scale, of an embodiment similar to FIG. 8A.

In the embodiments of FIGS. 2-7, the radial lips 206, and also the axial arms 204, are integral with the seal rings 202. FIGS. 8A and 8B are sectional views of two embodiments in which the radial lips 206 are formed in lip modules 800 that are separate from, but sealed to, the seal rings 202. In these embodiments, canted springs 802 are included to provide additional tension between the radial lips 206 and the collar 118.

Figure 9A:
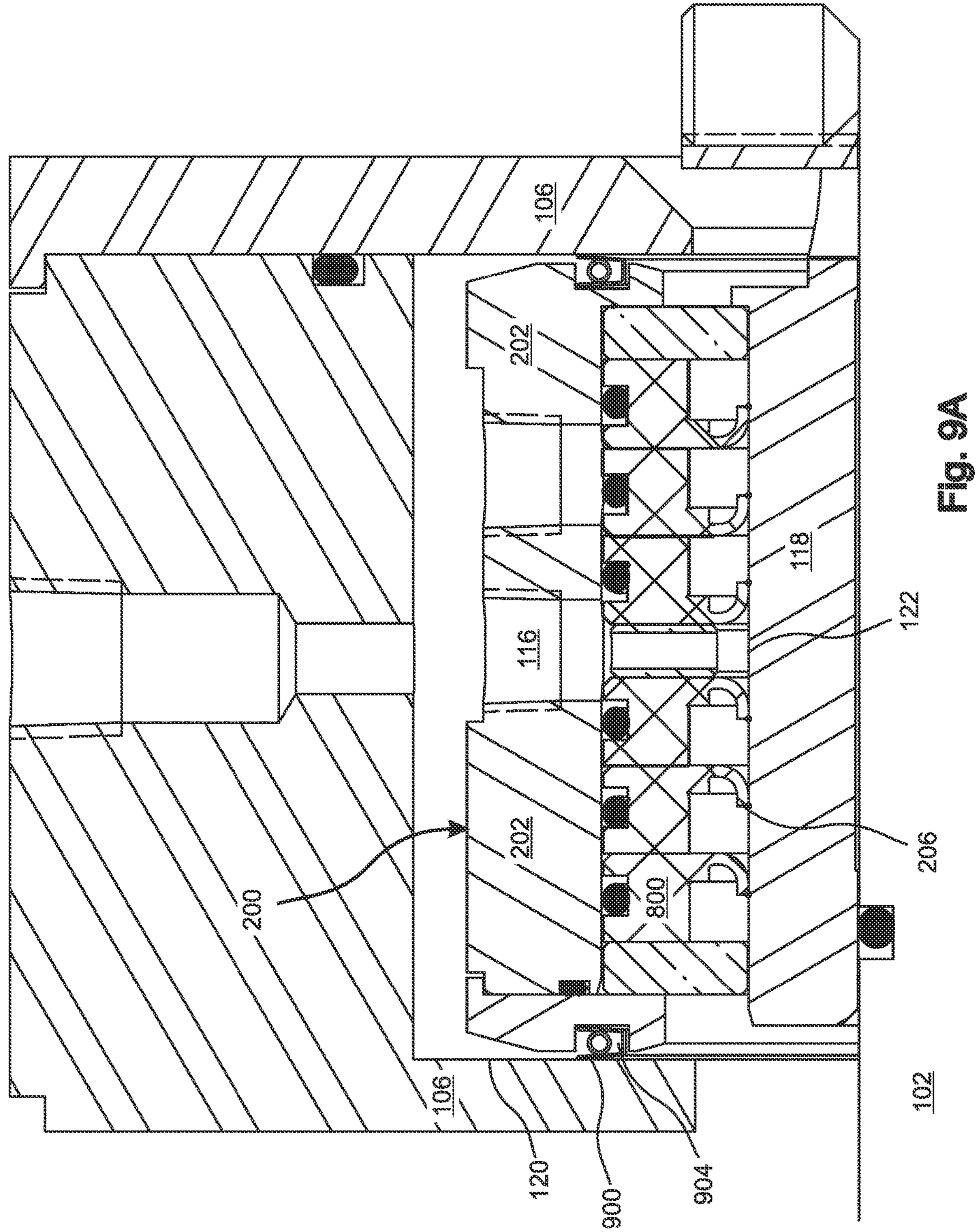
FIG. 9A is a sectional view, drawn to scale, of an embodiment in which the axial lips are included in separate end rings that seal both to the seal ring and to the axial housing walls.

FIG. 9A is a sectional view of an embodiments in which neither the radial lips 206 nor the axial lips 900 are integral with the seal rings 202. In the illustrated embodiment, the radial lips 206 are formed in separate lip modules 800, similar to FIGS. 8A and 8B. In addition, the axial lips are formed in separate end rings 900 that are installed within grooves 904 at the axial ends of the seal assembly 200.

Figure 9B:
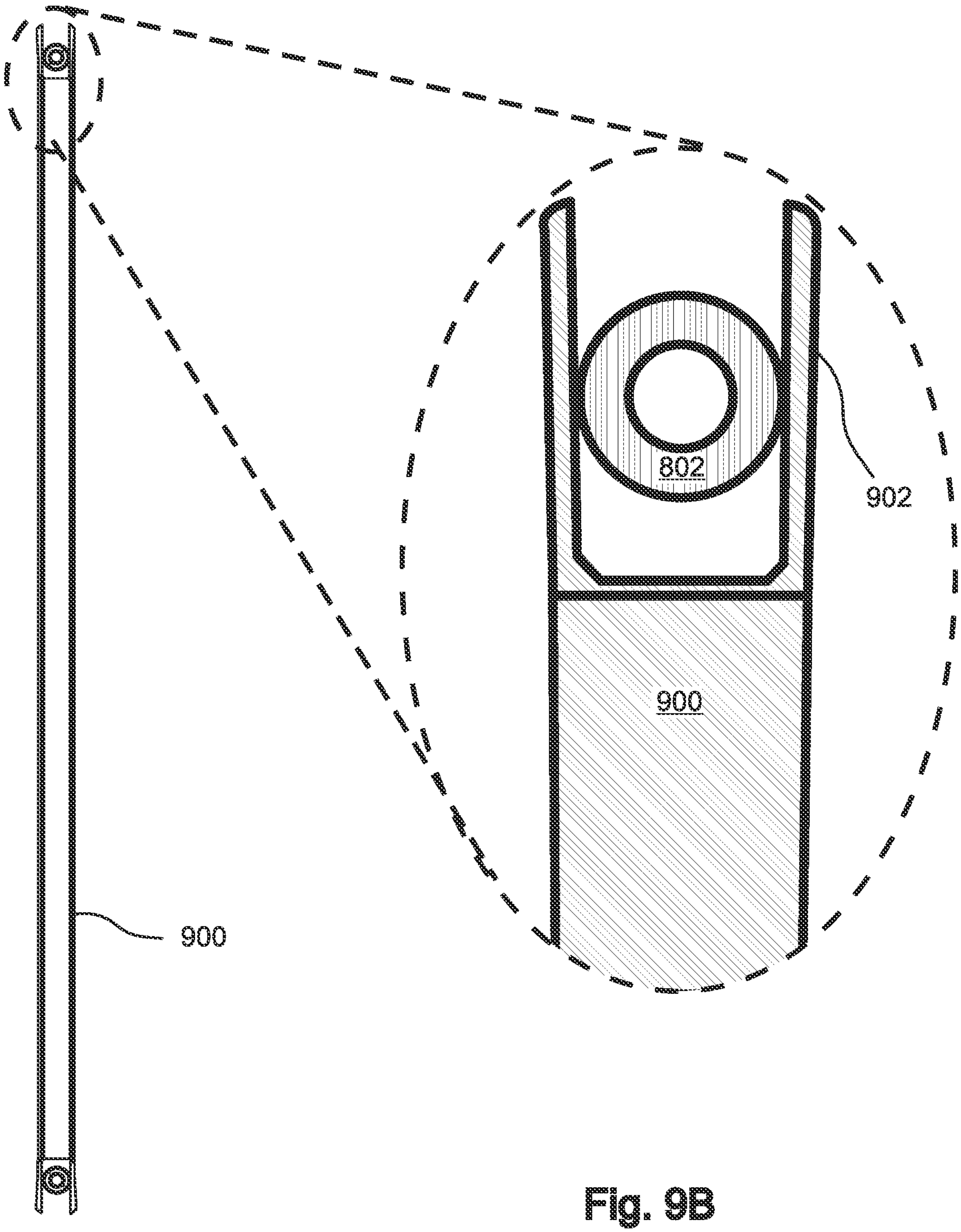
FIG. 9B is a sectional view, drawn to scale, of one of the end rings of FIG. 9A.

FIG. 9B is a sectional side view of one of the end rings 900 of FIG. 9A. It can be seen in the expanded view of the top end of the end ring 900 that a pair of radially extending walls 902 extend radially outward from the end ring 900. The radially extending walls are spaced apart from each other and function as axial lips 204 that are pressed outward by a canted spring 802. When the end rings 900 are assembled with the ring assembly 200, as shown in FIG. 9A, the radially extending walls 902 are pressed outward by the canted spring 802 and form lip seals both with the vertical wall 120 of the housing and with the seal ring 202. It will be understood that similar embodiments include other mechanisms for pressing the radially extending walls 902 outward, which can include an O-ring or other elastomeric device, a U-shaped spring 400 as discussed above, or a shaping and elasticity of the radially extending walls 902 themselves.

Figure 10A:
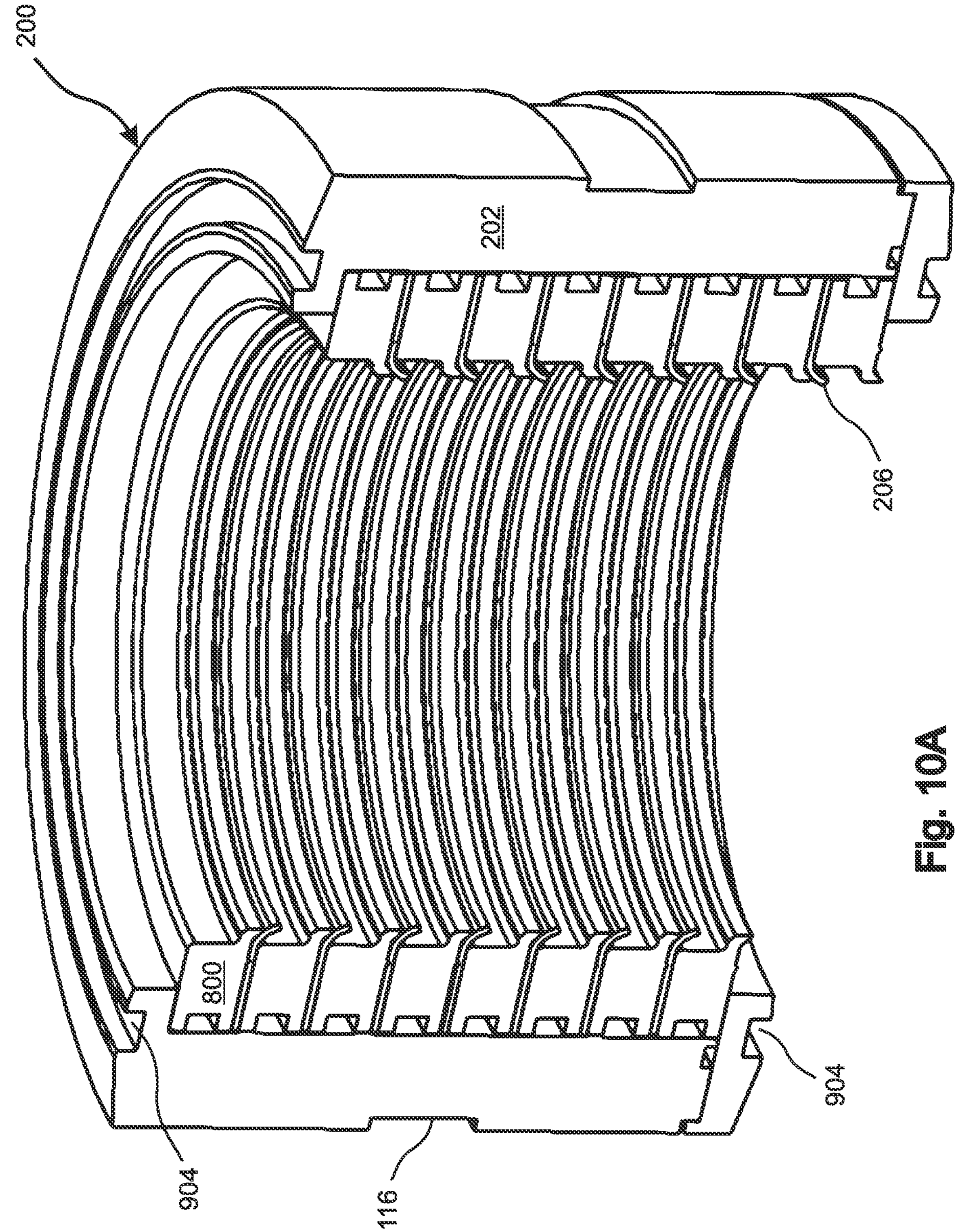
FIG. 10A is a perspective sectional view, drawn to scale, of a seal ring assembly in an embodiment that is similar to the embodiment of FIG. 9A, except that the assembly includes only one seal ring, and all of the lips are angled in the same axial direction.
Figure 10B:
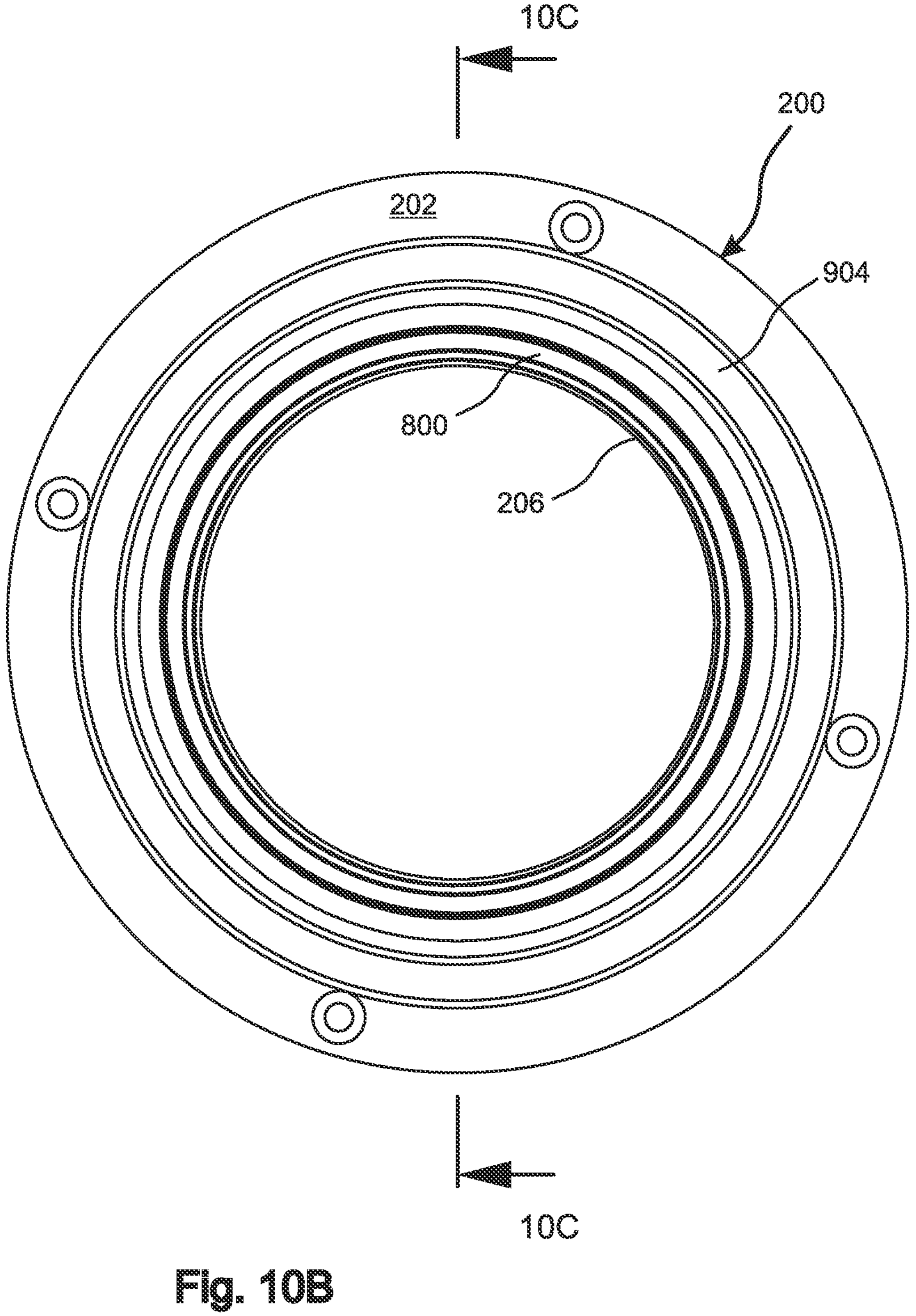
FIG. 10B is a top view, drawn to scale, of the seal ring assembly of FIG. 10A.
Figure 10C:
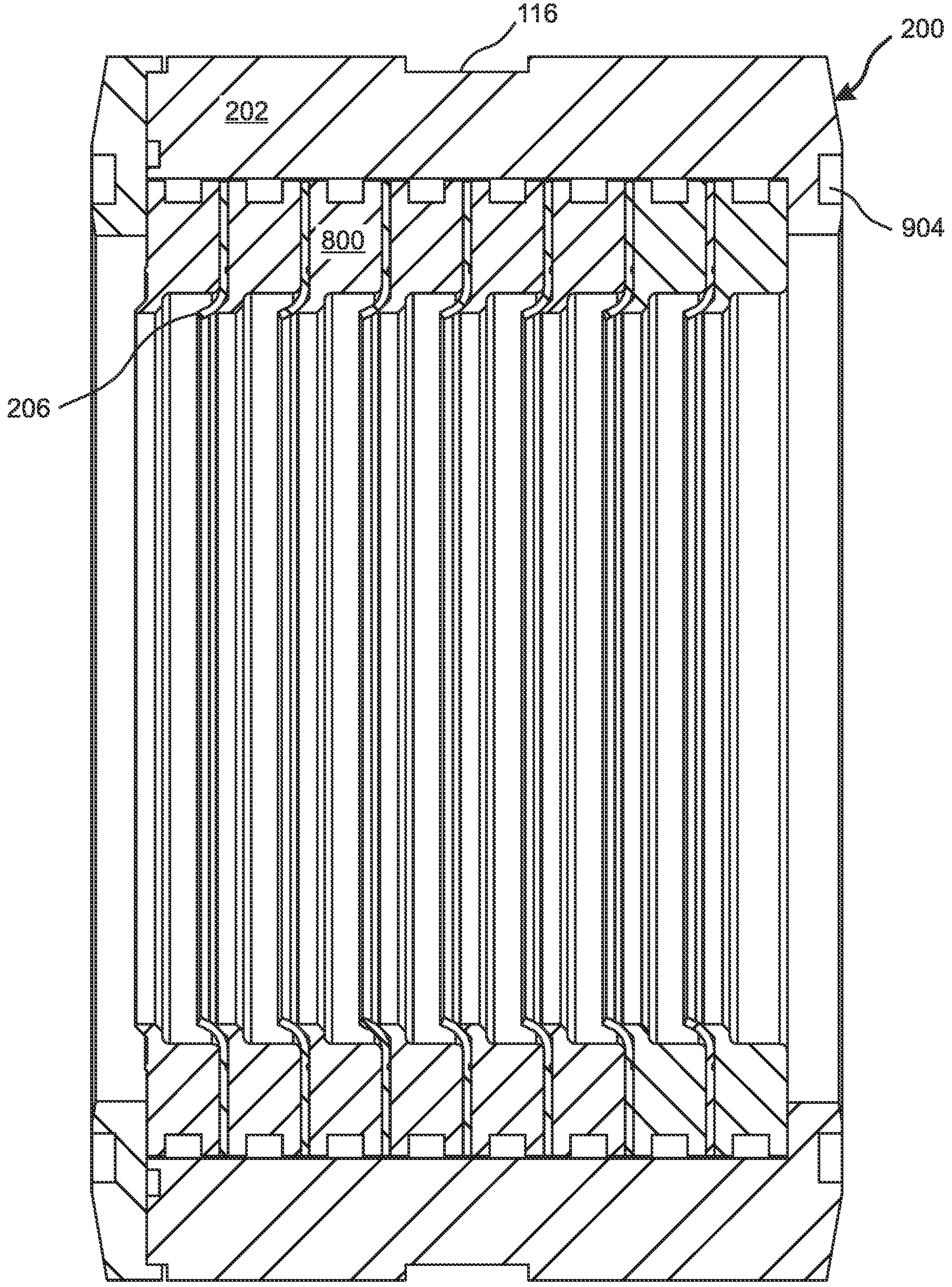
FIG. 10C is a sectional view, drawn to scale, of the seal ring assembly of FIG. 10A, with the section taken along the plane indicated in FIG. 10B.

FIG. 10A is a perspective sectional view of a seal ring assembly 200, shown without the end rings 900, in an embodiment that is similar to the embodiment of FIG. 9A, except that the assembly 200 includes only one seal ring 202, and all of the lips 206 are angled in the same axial direction. FIG. 10B is a top view of the seal ring assembly 200 of FIG. 10A; and FIG. 10C is a sectional view of the seal ring assembly 200 of FIG. 10A, with the section taken along the plane indicated in FIG. 10B.

It will be noted that all of the illustrated embodiments include a series of more than one radial lip 206 extending inward from the seal ring assembly 204. In some of these embodiments the radial lips 206 are configured, as the pressure of a sealed process fluid increases, to allow a small amount of the process fluid to penetrate past at least one of the radial lips 206 in the series, while leakage into the environment is prevented by a subsequent radial lip 206 in the series. According to this approach, the radially inward force that must be exerted by each of the radial lips 206 against the shaft 102 is reduced, because the pressure of the process fluid is reduced as it penetrates past each of the radial lips 206, so that it is only necessary for the final radial lip 206 in the series to exert sufficient inward force to contain the residual pressure of any process fluid that is able to penetrate past the other radial lips 206. As a result, the friction and wear of the radial lips 206 is reduced.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

What is claimed is:

1. A tiltable lip seal comprising:

a stationary housing penetrated by a bore having a longitudinal bore axis;

a rotatable shaft penetrating said bore, said rotatable shaft having a longitudinal shaft axis;

a seal ring assembly coaxially surrounding the rotating shaft;

at least one radial lip extending radially inward from the seal ring assembly and configured to form a sliding seal between the seal ring assembly and the shaft; and a plurality of flexible axial arms comprising first and second axial arms, the first and second axial arms extending at oblique angles outward from opposing axial ends of the seal ring assembly and forming a seal between the seal ring assembly and the housing, a proximal end of each of the flexible axial arms being fixed to or monolithic with the seal ring assembly, a distal end of each of the axial arms being separated by an axial gap from the seal ring assembly, wherein the first axial arm extends from a first seal ring of the seal ring assembly, and the second axial arm extends from a second seal ring of the seal ring assembly, the first and second seal rings being separably attached and sealed to each other in the seal ring assembly;

wherein radial displacement of the seal ring assembly relative to the housing is enabled by at least one of sliding and flexing of the axial arms;

wherein rotation of the rotatable shaft relative to the seal ring assembly is enabled by sliding of the radial lips against the rotatable shaft;

wherein tilting of the shaft axis away from the bore axis is enabled at least in part by flexing of the axial arms; and wherein said oblique angles are variable by flexing of portions of said axial arms, thereby enabling the seal assembly to remain coaxial with and sealed to the shaft when the shaft axis is not aligned with the bore axis.

2. The lip seal of claim 1, wherein the seal ring assembly is sandwiched between a proximate pair of annular radial walls of said housing, and wherein the axial arms are axial lips that form lip seals with the radial walls of the housing.

3. The lip seal of claim 2, wherein the axial lips are included in end rings that form axial lip seals with both the seal ring assembly and the annular radial walls of the housing.

4. The lip seal of claim 2, wherein the axial lips are maintained in sealing contact with the annular radial walls of the housing due to elasticity of the axial lips.

5. The lip seal of claim 2, further comprising a pair of springs cooperative with the first and second axial lips and configured to press the axial lips into contact with the annular radial walls of the housing.

6. The lip seal of claim 5, wherein the springs are canted coil springs.

7. The lip seal of claim 5, wherein the springs are petalized U-springs.

8. The lip seal of claim 7, wherein the U springs are petalized on only one side thereof.

9. The lip seal of claim 7, wherein the U springs are petalized on opposing sides thereof.

10. The lip seal of claim 1, wherein distal ends of the axial arms are fixed to the housing and remain fixed in location, and wherein both radial displacements and axial tilting of the seal ring assembly are accommodated by flexing of the axial arms.

11. The lip seal of claim 10, wherein the distal ends of the axial arms are fixed to the housing by being clamped between elements of the housing.

12. The lip seal of claim 1, wherein the axial arms are axial extensions of the seal ring assembly.

13. The lip seal of claim 1, wherein each of the radial lips is formed in a separate lip module, each of the lip modules being separately sealed to the seal ring assembly.

14. The lip seal of claim 1, wherein the at least one radial lip includes a plurality of radial lips.

15. The lip seal of claim 14, wherein at least two of the radial lips extend axially in the same direction.

16. The lip seal of claim 14, wherein at least two of the radial lips extend in opposite axial directions.

17. The lip seal of claim 1, further comprising a buffer fluid port configured to enable introduction of a buffer fluid into the lip seal.

18. The lip seal of claim 17, wherein the lip seal is configured to cause a pressure of the buffer fluid to increase a radially inward force applied by at least one of the axial lips toward the shaft.

19. The lip seal of claim 17, wherein the lip seal is configured to cause small amounts of the buffer fluid to pass between the shaft and at least one of the radial lips, thereby lifting the radial lip away from direct contact with the shaft.

* * * * *